(No Model.)
G. J. FERGUSON.
CAR BRAKE.
No. 493,491. Patented Mar. 14, 1893.
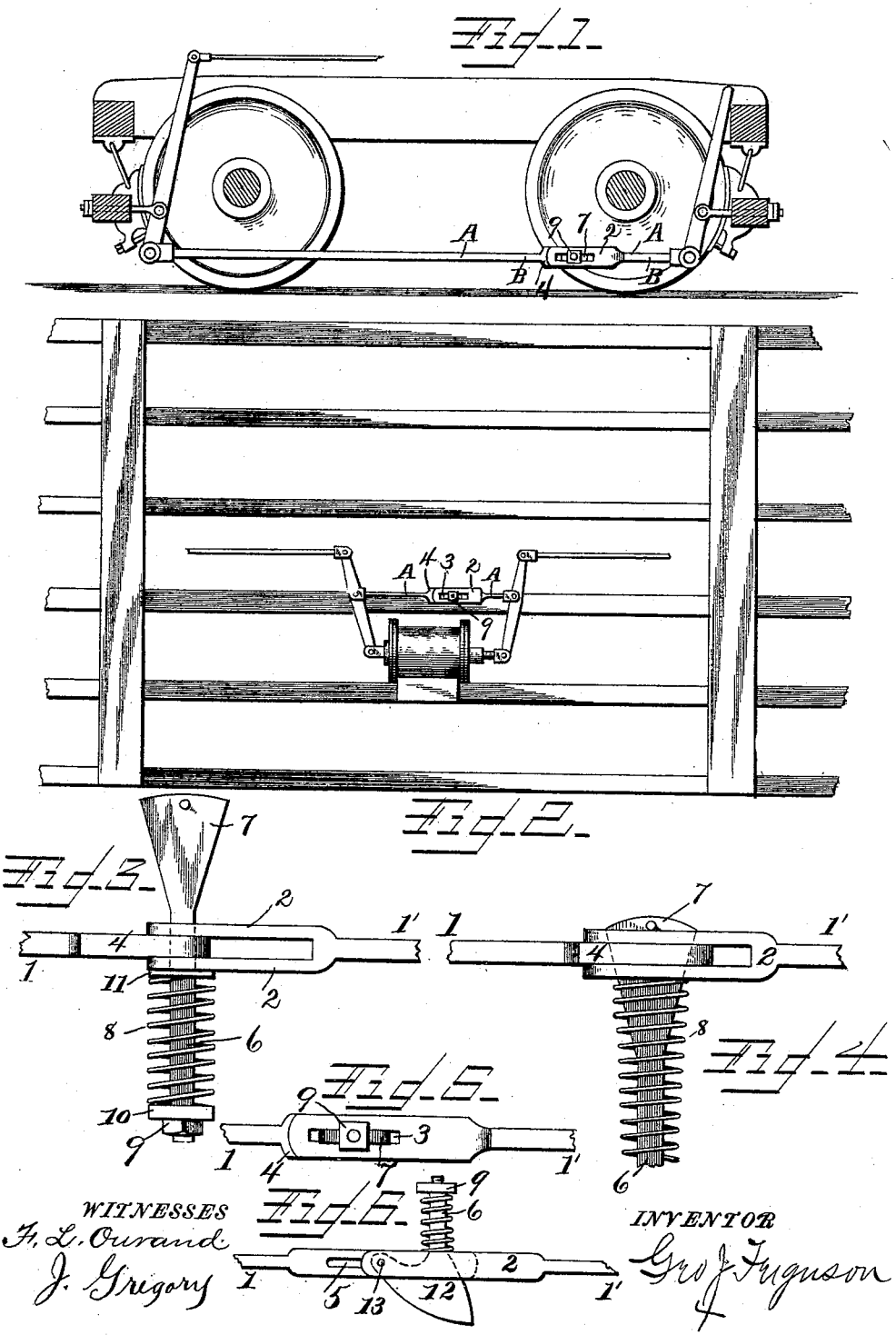
WITNESSES
F. L. Ourand
J. Gregory
INVENTOR
Geo. J. Ferguson

UNITED STATES PATENT OFFICE.

GEORGE J. FERGUSON, OF GREENVILLE, TEXAS.

CAR-BRAKE.

SPECIFICATION forming part of Letters Patent No. 493,491, dated March 14, 1893.

Application filed June 27, 1892. Serial No. 438,171. (No model.)

*To all whom it may concern:*

Be it known that I, GEORGE JONES FERGUSON, residing at Greenville, in the county of Hunt and State of Texas, have invented a new and useful Car-Brake Adjuster, of which the following is a specification.

My invention relates to devices to automatically absorb the slack in car brake connecting rods which slack is induced by the wear of the brake shoes and fastenings and the stretching of the parts by the strain in applying the brake.

The objects of my invention are, first, to effect this necessary adjustment automatically; second, to do it cheaply and without changing the construction of the brake rigging except by adding my improvement; third, by providing a device whereby the slack may be adjusted by the car repairers independent of the automatic feature; fourth, to provide a device which may be applied to the bottom brake rods, and also to the brake cylinder connecting rod. It can be used on either or both rods.

In the drawings Figure 1 shows a view of a car truck, the bottom brake rod of which is equipped with my device. Fig. 2 shows its application to the brake connecting rod of the cylinder levers. Fig. 3 shows the device in relieved position. Fig. 4 shows the device fully applied. Fig. 5 shows a side view. Fig. 6 shows a view of a modification.

Similar numbers and letters denote similar parts in the specification and drawings.

My invention relates to slack adjusters which automatically absorb the slack in the connecting rods of a car brake.

The device is applied by cutting the connecting brake rods and welding the ends 1, 1', to the cut ends of the brake connecting rods, it will be noted that the only change in the construction is the addition of my device in place of the portion of the rod cut out.

My device is simply a fork 2 having scarfed end 1', and being provided with slots 3 in each side, or half of the fork 2, these slots being parallel with each other, and within this fork 2 is placed a flat bar 4 having a slot 5 corresponding with slots 3 in the fork 2, and having a scarfed end 1, to weld onto the connecting rod A at B, the bar 4 is made to slide freely within the fork 2 and the slots are brought into alignment so that the shank 6 of the wedge 7 can be inserted through the slots 3 in the fork 2 and also simultaneously pass through the slot 5 in the bar 4 and the spring 8 which is compressed and placed upon the shank 6 of the wedge 7 when the nut 9 is secured against the spring seat 10, a corresponding spring seat 11, is placed between the spiral spring 8 and the fork 2 so that the release of the compressed spring 8 will pull the wedge 7 farther into the slots 3 and 5 and take up the slack continuously according to the wear of the brake shoes &c. The spring 8 may be a spiral as shown, or it may be an elliptic spring, and it may be made tapering to admit the wide portion of the wedge in position as shown in Fig. 4 without departing from the spirit of the invention, also this spring may be dispensed with in some cases as gravity would effect the same purpose.

This device absorbs the slightest amount of slack and its action is continuous as the wedge will retain whatever slack it takes up regardless of what amount of strain is applied to the connections. Fig. 2 shows its application to the brake cylinder connecting rod where it will absorb the slack of both ends of the brake rigging at once. When applied to a truck equipped with relief springs the strength of the spiral spring 8 will be such that it will overcome their action at the moment of the release of the brake, by reaction of the connections but when applied to a truck without relief springs the strength of the spring 8 will be reduced so as merely to overcome the weight of the brake rigging.

The operation is as follows: The reaction caused by relieving the brake after an application permits the spiral spring 8 to pull the wedge 7 farther into the slots 3 and 5 as the reaction moves the sliding fork 2 and the bar 4 toward, and farther into each other and the further movement of the wedge 7 into the slots 3 and 5 takes up slack in proportion to its increased width and this action is automatic and continuous as it takes up a fraction of slack at every action of the brake.

This device may be used on many different devices to absorb slack as well as on car brakes.

This device is almost indispensable on a six wheel truck, as it will automatically adjust each connecting rod separately and independently of the other. This function has been found to be very difficult to accomplish in practice; in fact, it has not been possible heretofore so far as I am aware. I do not limit myself to any particular rod on which it may be applied as it may be applied to any one, or all.

Fig. 6 shows a modification wherein a cam 12 acts in a similar manner to the wedge 7, the cam 12 being pivoted at 13.

Having described my invention, what I claim as new is—

1. A slotted sliding joint between the ends of the brake connecting rods in combination with a wedge operating in said slots substantially as set forth.

2. A sliding joint between the ends of the brake connecting rods, in combination with wedge devices to automatically absorb the slack substantially as set forth.

3. The combination of the brake connecting rods, a slotted fork, a slotted bar capable of parallel movement within said fork, a wedge constructed to operate within said slots, a spring bearing against the slotted fork, and against a retaining nut on the end of the wedge substantially as set forth.

4. A slotted sliding joint between the ends of the brake connecting rods, in combination with a wedge or cam device to shorten said connecting rods substantially as set forth.

GEO. J. FERGUSON.

Witnesses:
EMMA M. GILLETT,
JOHN G. KROHR.